March 23, 1954
B. N. ASHTON
2,672,731
SELF-CONTAINED POWER ACTUATOR
Filed Aug. 1, 1951
4 Sheets-Sheet 1
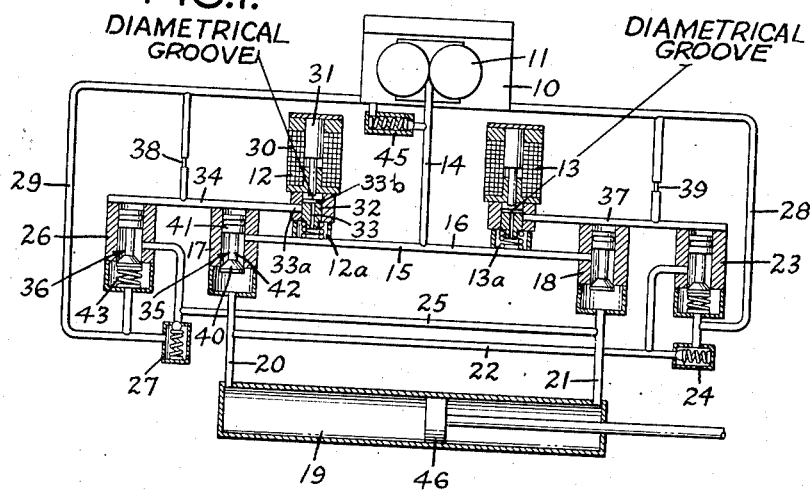
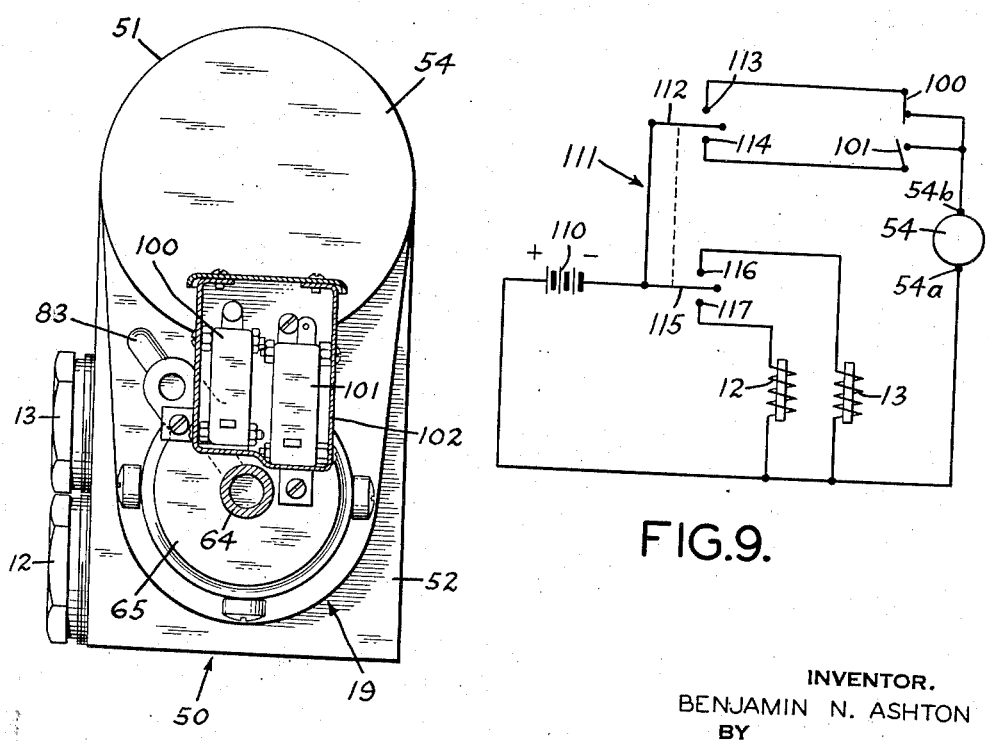
INVENTOR.
BENJAMIN N. ASHTON
BY
HIS ATTORNEYS.

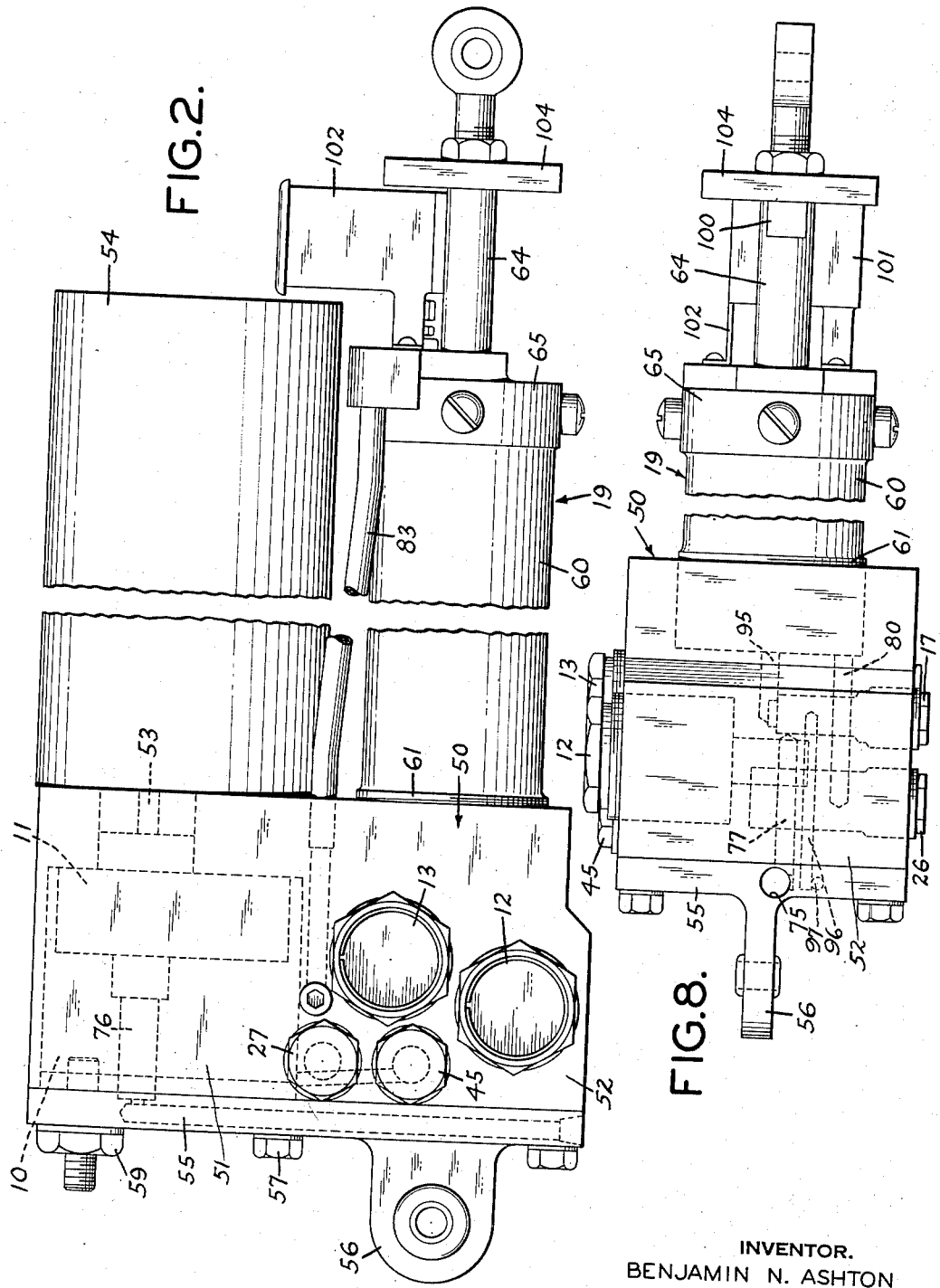

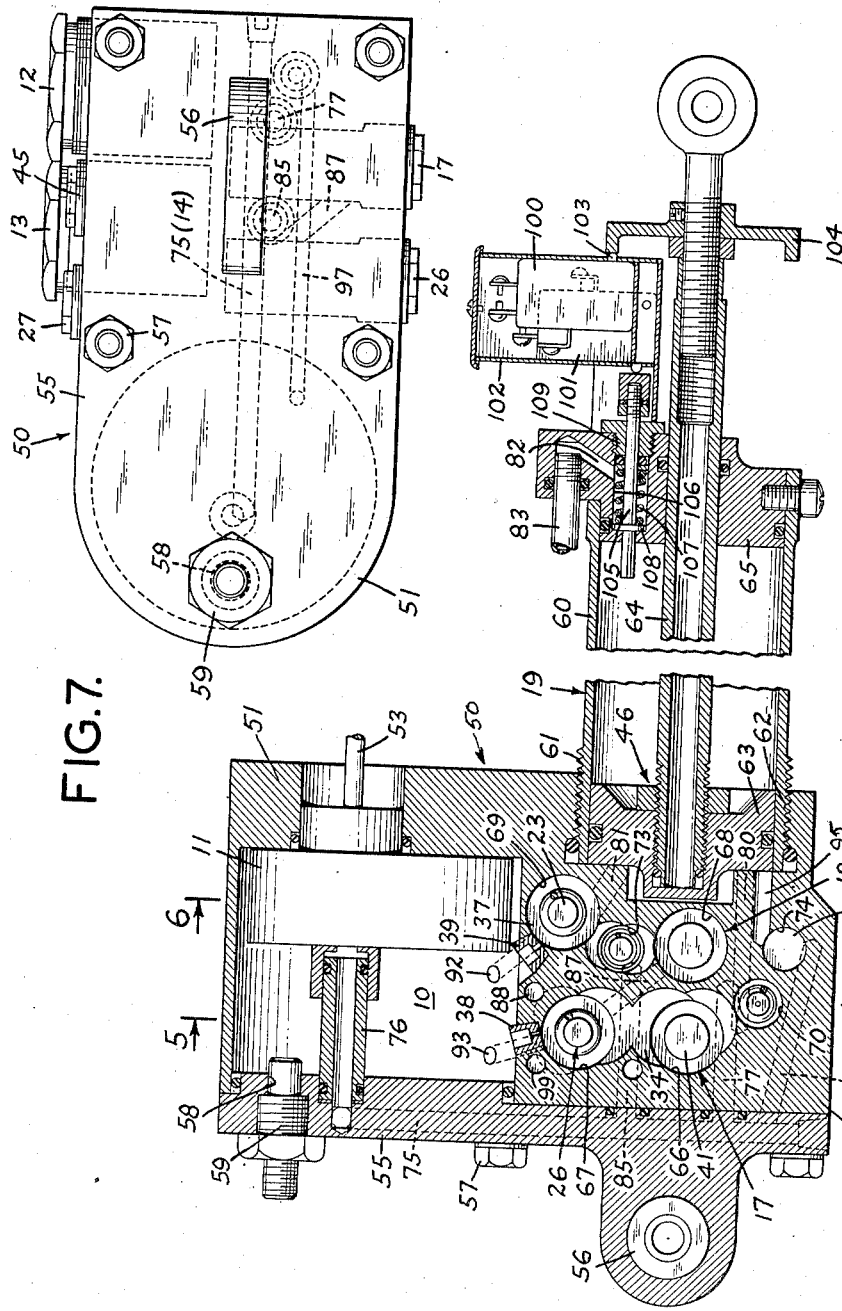

March 23, 1954

B. N. ASHTON 2,672,731

SELF-CONTAINED POWER ACTUATOR

Filed Aug. 1, 1951

INVENTOR.
BENJAMIN N. ASHTON
BY
Campbell, Brumbaugh, Free & Graves
HIS ATTORNEYS.

Patented Mar. 23, 1954

2,672,731

UNITED STATES PATENT OFFICE 2,672,731

SELF-CONTAINED POWER ACTUATOR

Benjamin N. Ashton, Kingston, N. Y., assignor to Electrol Incorporated, Kingston, N. Y., a corporation of Delaware Application August 1, 1951, Serial No. 239,801

8 Claims. (Cl. 60—52)

This invention relates to improvements in self-contained electro-hydraulic actuators or jacks to actuate landing gear, wing flaps and other movable elements of aircraft and other devices. The invention further relates to an improved electrically and hydraulically actuated jack or power actuator and to an improved type of selector valve. It also relates to a system for actuating a selector valve for devices of the type referred to above and other flow control systems.

Devices of the type embodying the present invention comprise a unitary self-contained hydraulic power unit including a pump driven by an electric motor to supply liquid under pressure to a jack carried by the supporting structure for the motor and the pump, and a selector valve system also mounted in the supporting structure for controlling the supply of liquid to the jack to drive it in either direction, selectively. More particularly, a typical power actuator includes a casing having a reservoir therein to receive liquid and a pump mounted in the casing and communicating with the reservoir to withdraw liquid therefrom and supply it under the control of a selector valve to a jack or ram also mounted on the casing. The pump is driven by an electric motor also carried by the casing and the motor is controlled by means of suitable switches in the cockpit or other convenient location in a vehicle or aircraft and by limit switches to thereby start and stop the motor, as may be required, to drive or stop the jack.

The selector valve mechanism is electrically controlled to admit liquid from the pump into the jack and to drive it selectively, in either direction of operation. The selector valve involves a novel control system wherein the individual valves making up the selector valve are actuated by means of liquid under pressure under the control of solenoid actuated valves operable from a remote point. The individual selector valves are of the pressure balanced type, and are opened by means of unbalancing pressures supplied by the pump under the control of the solenoid valves to assure positive operation of these valves. The use of the pressure in the system to open and close the selector valves makes possible a considerable simplification of the system for controlling these valves and eliminates mechanical actuating elements, such as cams, cranks, or the like, which are commonly used in such selector valves.

Systems of the type embodying the present invention can be positioned at places remote from a main control point and can be readily controlled by switches conveniently located on a control panel at the control point. Inasmuch as each actuator unit is self-contained, the only connections required are the electrical connections between the switches and the units which can be installed easily in a minimum of space.

For a better understanding of the present invention, reference may be had to the accompanying drawings, in which:

Fig. 1 is a diagrammatic illustration of a typical system, including selector valves, a jack and pump, embodying the present invention;

Fig. 2 is a view in side elevation of a typical power actuator of the type embodying the present invention;

Fig. 3 is a view in vertical section through the power actuator shown in Fig. 2, with the motor removed;

Fig. 4 is a view in end elevation of the power actuator illustrated in Figs. 2 and 3;

Fig. 7 is a view in end elevation of the power actuator looking toward the left-hand end of Fig. 2;

Fig. 8 is a bottom view of the actuator; and

Fig. 9 is a wiring diagram of the system.

Figure 6:
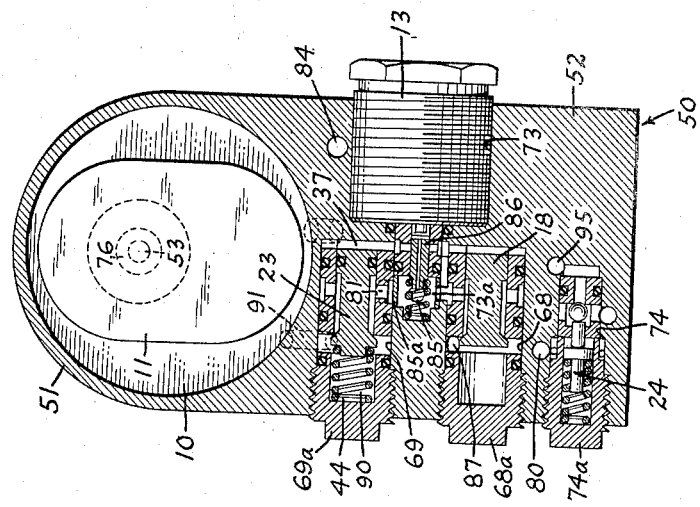
Fig. 6 is a view in section taken on line 6—6 of Fig. 3.

The system illustrated diagrammatically in Fig. 1 of the drawing shows the general principles underlying the construction and operation of power actuators of the type embodying the present invention. As shown in Fig. 1, the system includes a reservoir 10 to receive liquid, and a pump 11, such as a gear pump, mounted in the reservoir to withdraw liquid therefrom and supply it to a pair of solenoid-controlled valves 12 and 13 through a conduit 14 having the branches 15 and 16 connected to the liquid-receiving chambers 12a and 13a of the valves 12 and 13.

The conduits 15 and 16 also communicate with the poppet valves 17 and 18 respectively, which control the flow of liquid to the hydraulic jack or motor 19. The valve 17 is connected by means of a conduit 20 to the left-hand end of the cylinder and the valve 18 is connected by a conduit 21 to the right-hand end of the cylinder. The conduit 20 is also connected by means of a return conduit 22 to a return poppet valve 23 and to a thermal relief check valve 24. Similarly, the conduit 21 is connected by means of a return conduit 25 to a return poppet valve 26 and a thermal relief check valve 27.

The return poppet valves 23 and 26 are connected by return conduits 28 and 29 to the reservoir 10, these conduits also communicating with the thermal relief valves 24 and 27 so that excess, heat-expanded liquid can be returned to the reservoir.

The solenoid control valves 12 and 13 are alike. The valve 12, for example includes a solenoid coil 30 which, upon energization, displaces an armature 31 engaging at its outer end a slide valve plug 32. The slide valve plug has an axial passage 33 therein and a diametrically extending groove 33b in its end through which liquid from the conduit 15, for example, can flow upwardly and through the lateral port 33a into a passage 34 communicating with the back of the poppets 35 and 36 of the valves 17 and 26. The groove 33b provides a flow passage even when the end of the armature 31 engages the end of the valve plug 32.

The solenoid valve 13 is similarly connected to the backs of the poppet valves 18 and 23 by means of a passage and chamber system 37.

The passage 34 is connected by means of a restricted orifice 38 to the return line 29 and the passage 37 is connected by means of a restricted orifice 39 to the return conduit 28.

The slide valves 12 and 13 when de-energized, prevent communication between the passages 15 and 34 and the passages 16 and 37.

Figure 5:
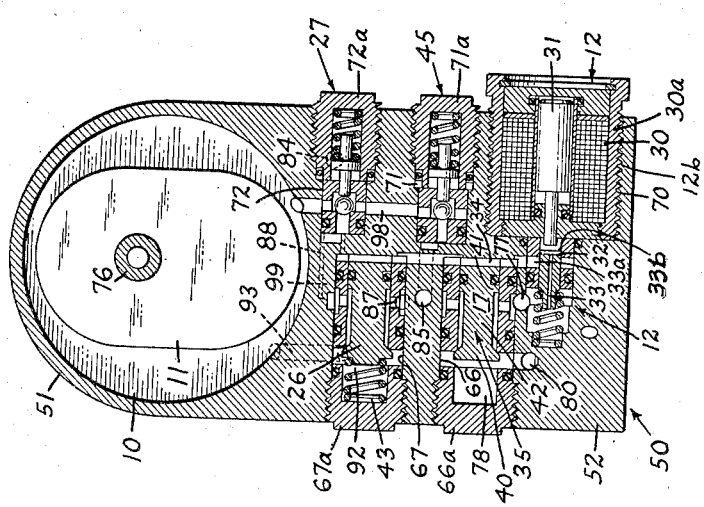
Fig. 5 is a view in section taken on line 5—5 of Fig. 3.

The poppet valves 17 and 18 are of substantially the same construction and are of the pressure balanced type. As best shown in Figs. 1, 5 and 6, the poppet valve plug 35 has a valve head 40 having an area exposed to the pressure of the liquid equal to the area of a balancing piston 41 on the opposite end of the valve stem 42. The valves 23 and 26 are similar to the valve 17 but they are normally urged shut by means of biasing springs 43 and 44.

Referring again to Fig. 1, and assuming that the pump 11 is in operation, and the solenoid control valves 12 and 13 are closed, liquid under pressure is supplied through the conduit 15 to each of the valves 17 and 18 between the rod ends of the valve head 40 and the piston 41. The liquid circulated by the pump is returned to the reservoir by means of the main relief or unloading valve 45 interposed between the conduit 14 and the reservoir 10. The pressure in the conduit 34 is about the same as the pressure of the liquid at the intake of the pump 11 so that the pressure on the rod end of the piston 41 will be greater than the pressure on its head end.

When, for example, the solenoid 30 of the solenoid valve 12 is energized, the valve plug 32 is displaced downwardly and the liquid from the pump flows through the passage 33 and the groove 33b in the plug and the port 33a into the passage 34 behind the pistons of the valves 17 and 26. The liquid pressure acting on the head end of the piston 41 then becomes equal to the pressure on its rod end.

Liquid cannot flow from the valve 17 through the conduit 22 because it is opposed by the biased thermal relief check valve 24 and the return poppet valve 23 which is biased closed and further is in a balanced condition. Liquid from the right-hand end of the cylinder can, however, flow through the conduits 21 and 25, through the return poppet valve 26 when it is open and the conduit 29 back to the reservoir 10.

When the solenoid valve 12 closes, communication between the conduit 15 and the passage 34 is cut off. As the liquid in the passage 34 bleeds off through the orifice 38 into the reservoir 10 (low pressure zone), the pressure in the passage 34 drops to pump intake pressure, and the pressure on the rod end of the piston 41 becomes greater than the pressure on its head end and the unbalanced piston will tend to urge the valve plug 35 to closed position. The return poppet 26 will also be urged to closed position by the spring 43 and the unequal pressures on the piston and valve head of the valve 26. Inasmuch as the valve 26 is closed, the liquid to the right of the piston 46 is trapped and the piston 46 cannot move to the right, even if the valve 17 remains open.

The operation of the system is as follows:

Assume the system is in the condition shown in Figure 1 with all of the valves, 17, 18, 23 and 26, closed. The pump 11 is operating so that pump output (high) pressure is present in lines 14, 15 and 16. The return lines 28 and 29 and the lines 34 and 37 are at pump intake (low) pressure.

The system is full of liquid and the liquid pressure in motor 19 on both sides of the piston 46 therein is equal to pump outlet (high) pressure.

With the conditions set forth above, the force acting on the rod ends of the piston 41 and the valve plug 40 of the valve 17 is the same and there is no tendency for the valve to be opened by the pressure between the piston 41 and the valve plug 40. The pressure acting on the head end of the valve plug 40 is the same as on its rod end because the motor 19 and the lines 20 and 22 are at pump outlet pressure. However, the pressure on the head end of the piston 41 is pump intake (low) pressure, much below the pump outlet (high) pressure, so that the force acting on the head end of the valve plug 40 is much greater than the force acting on the head end of the piston 41. This unbalance of forces causes the valve 17 to remain closed.

When the solenoid valve 12 is energized, the pressure in the line 34 becomes equal to the pressure in the line 15.

The valve head of the valve 26 is subjected at its head end to the low pump intake pressure and at its rod end to the high pump outlet pressure (system pressure). The rod and head ends of the piston are subjected to pump outlet pressure. Accordingly, the valve will be unbalanced and will open, thereby allowing liquid to flow to the intake of the pump from the right-hand end of the motor 19, producing a reduced pressure in the right hand end of the cylinder of the motor 19 and allowing the piston 46 therein to move to the right. The reduced pressure resulting from movement of the piston 46 will reduce the pressure exerted on the head end of the valve head 40 to less than the pressure on the head end of the piston 41 so that the valve plug 35 becomes unbalanced and opens. With both of the valves 17 and 26 open, the piston 46 will continue to move to the right until it reaches the end of the cylinder or until the valve 12 is closed. When the valve 12 is closed, the conditions in the system revert to the state illustrated in Figure 1. Reduction of pressure in the line 34 and on the head end of the piston of the valve 26 allows this valve to close so that liquid cannot flow from the motor 19 to the intake of the pump 11. Inasmuch as the valve 17 is open, the system is loaded to pump outlet pressure. The conditions now being the same as those initially described and present, the valve plug 35 will be unbalanced, will close and the system will be restored to a condition in which both of the valves 26 and 17 are in a closed position.

To move the piston 46 in the opposite direction, the solenoid valve 13 is energized so that the poppets 18 and 23 are opened and liquid flows through the valve 13 into the right-hand end of the cylinder 19 and out of the left-hand end of the cylinder through the valve 23 to the reservoir 10.

Due to the pressure balanced condition of the selector valves, little energy is required to actuate them and as a consequence the system is easily and positively operated to control the jack 19.

Having described the general principles of operation of a typical system and unit, reference may now be had to Figs. 2 to 8 of the drawings showing a typical power actuator unit.

The unit includes a casing member 50 which, as shown in Figs. 5, 6 and 7, has a semicircular upper end portion 51 and a generally rectangular body portion 52. The reservoir 10 is formed in the upper semicircular end of the casing and may be of cylindrical shape, as shown in Figs. 5 and 6. Pump 11 is mounted within the reservoir with its drive shaft 53 connected to an electric motor 54 which is supported at one end on the casing 50. The left-hand end of the reservoir 10, as shown in Fig. 3 is closed by means of a cover plate 55 carrying an eye lug 56 by means of which the unit can be supported in the aircraft or other structure. The cover plate 55 is secured by means of screws 57, or in any other way, to the left-hand end of the casing 50. The cover plate includes a filling opening 58 communicating with the reservoir 10 and receiving a plug 59 to enable the reservoir 10 to be drained and refilled as required. If desired the reservoir may be pressurized through an air check valve in the plug 59.

Directly below the motor 54 and supported at its left-hand end in the casing 50, is the jack 19. The jack may consist of a tubular member 60 having a threaded left-hand end 61 screwed into a threaded circular recess 62 in the lower rectangular part 52 of the casing 50.

The piston 46 includes a cylindrical head 63 mounted on a tubular or solid piston rod 64 which extends through an annular closure cap 65 mounted on the right-hand end of the tubular member 60. Suitable liquid-tight seals are interposed between the closure 65 and the tubular sleeve 60 and between the closure and the piston rod 64 to prevent leakage.

The selector valves including the poppets 17, 18, 23 and 26 are mounted in the lower section 52 of the casing behind the cylinder 19 and with the axes of the valve plugs generally perpendicular to the axis of the cylinder 19. Referring to Figs. 3 and 5, it will be seen that the valves 17 and 26 are mounted substantially one above the other in parallel bores 66 and 67 extending inwardly from the left-hand edge of the casing as viewed in Fig. 5. The outer ends of these bores are plugged by means of suitable threaded plugs and caps 66a and 67a. The plugs 66a and 67a act to limit the opening movement of the valve plugs of the valves 17 and 26 so that the balancing pistons thereon do not block the passages 15 and 25, respectively. The valves 18 and 23 are mounted in the parallel bores 68 and 69 which are spaced apart generally vertically in the casing (Figs. 3 and 6). These bores have their outer ends closed by the plugs 68a and 69a.

The solenoid control valve 12 for controlling the valves 17 and 26 is mounted below the valve 17 in a bore 70 extending from the right-hand side of the casing as viewed in Fig. 5. The coil of this valve has a threaded casing 30a which is screw in the bore 70. Above the solenoid valve 70 in the bores 71 and 72, respectively, are the main relief valve 45 and the thermal relief valve 27 which are of the ball check type and are retained in the bores by the threaded plugs 71a and 72a.

As shown in Fig. 6, the solenoid control valve 13 is mounted in a bore 73 extending inwardly from the right-hand end of the casing 50 and terminating about mid-way between and communicating with the bores 68 and 69.

The thermal relief valve 24 is mounted in a bore 74 below the bore 68. This valve is of the ball check type and is held in the bore by means of the threaded plug 74a.

The connections between the several elements referred to above are as follows. The cover plate 55 is provided with a passage 75 which communicates with a conduit or pipe 76 connected to the outlet of the pump 11 so that the liquid under pressure is delivered through the passage. The passage 75 and pipe 76 correspond to the conduit 14 in Fig. 1. The passage 75, at its lower end, communicates with a cross bore 77 corresponding to the passage 15 (Fig. 1) which introduces liquid under pressure into the poppet valve 17 between the head 40 and the piston 41 thereof as shown in Fig. 5. The passage 77 also intersects a reduced portion of the bore 70 in which the slide valve plug 32 is received so that liquid can flow through the passage 33 therein and the port 33a into the passage 34 behind the valves 17 and 26. The passage 34 shown in section in Fig. 3 may be formed by recess milling the bottoms of the bores 66 and 67.

The chamber or space 78 in front of the plug head 40 formed by the bore 66 and a closure plug 66a communicates with a passage 80, Figs. 3, 5 and 6 connected to the left-hand end of the cylinder 19 as viewed in Fig. 3. This latter passage corresponds to the passage 20 shown in Fig. 1. The connection corresponding to the passage 22 between the valve 17 and the valves 23 and 24 of Fig. 1 includes the passage 81, Figs. 3 and 6, between the left-hand end of the cylinder 19 and the space between the plug head and balancing piston of the valve 23, and the passage 95 between the left-hand end of the cylinder 19 and the bottom of relief valve 24.

The connections between the valves 18 and 26 and the right-hand end of the cylinder are as follows.

The cylinder end closure 65 is provided with a passage and port 82 communicating with the interior of the cylinder and with a pipe or conduit 83 which is connected to a passage or bore 84 in the casing 50 above the solenoid valve 13 as shown in Figs. 5 and 6. The bore 84 and the conduit 83 correspond to the passages 21 and 25 of Fig. 1.

The pressure passage 75 communicates with a transverse passage 85, Figs. 3 and 6, which communicates with the reduced portion 73a of the bore 73 in which the solenoid valve 13 is mounted. Passage 85 corresponds to passage 16 of Fig. 1. As indicated above, the bore 73 intersects and communicates with the bores 68 and 69 in which the valves 18 and 23 are mounted so that liquid under pressure is supplied against the inner end of the slide valve plug 86 of the solenoid valve 13 and also to the zone between the ends of the plug of the valve 18. The solenoid valve 13 controls the flow of liquid into the chamber or passage 37 formed by recess milling the inner end of the bore 73 to connect it to the inner ends of the bores 68 and 69. The liquid in the bore 85 can flow by the valve 18 when it is opened into the inclined passage 87 (corresponding to passage 25 of Fig. 1) which connects to the bore 67 containing the return poppet valve 26 to supply liquid to the space between the head and piston of the valve. The bore 67 by recess milling intersects a passage 88 which, in turn, intersects passage 84 connected to the right-hand end of the cylinder. The pressure exerted between the ends of the poppet valve 26 has no effect on it inasmuch as this valve is balanced and is further biased to closed position by the spring 43.

The chamber 90 in front of the valve 23 is connected to the reservoir 10 by means of a return passage 91 corresponding to the passage 28 of Fig. 1. Similarly, the chamber 92 in front of the valve 26 is connected to the reservoir 10 by a return passage 93 corresponding to passage 29 of Fig. 1.

The pressure chamber 34 behind the valves 17 and 26 is connected through the orifice plate 38 (orifice 38), Fig. 3, to the reservoir 10 and the passage 37 is connected by the orifice plate 39 (orifice 39) Fig. 3, to the reservoir 10.

The thermal relief valve 24 is interposed between a bore 95, Figs. 3, 6 and 8, connected to the left-hand end of the cylinder 19 and a communicating bore 96 which connects with a vertical passage 97 in the end plate 55 in communication with the reservoir 10.

The main relief valve 45 is connected by a passage 85 and a passage 98 to the reservoir 10, as shown in Fig. 5. The thermal relief valve 27 is interposed between the passage 99 and the passage 98.

As shown in Fig. 5, the passage 98 intersects the bore 72 in which the relief valve 27 is mounted at the downstream side of the valve 27.

The various connections described above in the typical embodiment correspond to the connections shown in Fig. 1 and the unit is operated in the manner described in connection with Fig. 1.

In order to limit the travel of the piston, a pair of limit switches 100 and 101 are mounted in a casing or bracket 102 carried by the end closure 65 for the cylinder. The limit switches are normally biased to closed position. The switch 100 has an outwardly extending switch button 103 which is engaged by a disc-like collar 104 mounted near the outer end of the piston rod 64 to open the switch at the inner limit of movement of the piston and piston rod.

The limit switch 101 is actuated by means of a push rod 105 which is slidably mounted in a bore 106 in the closure 65 and is normally urged inwardly by means of a spring 107 engaging a flange 108 on the push rod and a closure collar 109 threaded in the outer end of the bore 106. Thus, when the right-hand face of the piston 63 strikes the inner end of the push rod, the switch 101 is opened.

The electrical circuit for the system is shown in Fig. 9. The circuit includes a source of electrical energy such as a battery 110 and having one pole thereof connected to one terminal of each of the coils of the solenoid valves 12 and 13, and to one terminal 54a of the motor 54. The other terminal of the battery is connected to a double pole, double throw switch 111, one blade 112 of which cooperates with the contacts 113 and 114. The other blade 115 cooperates with the contacts 116 and 117. The contact 113 is connected through the limit switch 100 to the terminal 54b of the motor 54. The other contact 114 is connected through the limit switch 101 to the terminal 54b of the motor 54. The contact 116 is connected to the coil of the solenoid switch 13 and the contact 117 is connected to the end of the coil of the solenoid switch 112. When the piston rod 64 is fully projected, the switch 101 is open as illustrated in Fig. 9. If the blades 112 and 115 are then engaged with the contacts 113 and 116, the solenoid valve 13 and the motor 54 are energized and the piston begins to move to the left until the collar 104 on the piston rod strikes the switch button 103 opening the switch 100 thereby de-energizing the motor 54 so that the pump stops. The motor can be stopped by opening the switch 111 before the piston reaches its limit position. In the meantime, of course, the switch 101 has closed because of movement of the piston and piston rod. If the double throw switch is moved to engage the contacts 114 and 117, the solenoid valve 12 and the motor 54 are energized and the latter operates until the switch 101 is opened by engagement of the piston with the push rod 105 unless the switch 111 is opened or its position reversed before the piston rod is fully extended. Upon opening the double throw switch 111 both of the solenoids and the motor are de-energized and no movement of the piston can take place because of the liquid trapped in the cylinder.

While the selector valve system has been described with reference to its use in a self-contained electrically actuated hydraulic system, it will be understood that it may be used equally well in other hydraulic or liquid flow control systems. It will be understood also, that the general arrangement of the elements of the hydraulic actuator may be modified to conform to the conditions under which it is used and that it may be made in various sizes and forms without departing from the invention. Therefore, the embodiment of the invention described herein should be considered as illustrative and not as limiting the scope of the following claims.

I claim:

1. A hydraulic actuator comprising a hydraulic motor having an inlet port to receive liquid under pressure to actuate said motor and an outlet port to discharge liquid from said motor, a pump to supply liquid under pressure to said motor, said pump having a pressure port and a return port connected to said inlet port and said outlet port, respectively, a first pressure balanced valve interposed between said pressure port and said inlet port and normally maintained in closed position to prevent flow of liquid from said pump to said inlet port, a second pressure balanced valve interposed between said outlet port and said return port and normally maintained in a closed position to prevent discharge of liquid from said motor to said pump, and a third normally closed valve interposed between said pressure port and said first and second valves, said third valve being movable to open position to apply fluid pressure to said first and second valves to open them and actuate said motor.

2. The hydraulic actuator set forth in claim 1, in which each of said first and second valves comprises a cylindrical chamber, a seat therein interposed between said pump and said motor, a poppet head cooperating with said seat, a stem extending from said head along said chamber, a balancing piston on said stem having an inner face subjected to the pressure of the liquid acting on opposed face of said poppet head, and a port in said chamber adjacent the outer face of said piston and connected to said third valve to supply liquid pressure against the outer face of said piston.

3. The hydraulic actuator set forth in claim 1 comprising a second separate set of said first and second valves interposed between said pump return port and said discharge port and said pump pressure port and said motor inlet port, respectively, and a separate said third valve interposed between said second set of valves and said pump pressure port to supply liquid pressure to said second set of valves to open them.

4. A hydraulic actuator comprising a hydraulic motor having an inlet port to receive liquid and an outlet port to discharge liquid, a motor-driven pump to supply liquid under pressure to said motor, said pump having a pressure port and a return port connected to said inlet port and said outlet port, respectively, a first pressure balanced poppet valve interposed between said pressure port and inlet port and normally maintained in closed position to prevent flow of liquid to said inlet port, a second pressure balanced valve interposed between said outlet port and said return port, and normally urged to closed position to prevent flow of liquid from said outlet port to said return port, said first and second valves each having a poppet valve head and a balancing piston having inner opposed faces exposed to the pressure of the liquid, a separate connection between said pressure port and the first and second valves to supply liquid under pressure against the outer faces of said pistons to urge said first and second valves to open position, a third valve interposed in said connection to open and close said connection, and means including a restricted orifice connecting said separate connection to said return port to relieve said outer faces of said pistons from liquid pressure in said separate connection to allow the first and second valves to close.

5. The hydraulic actuator set forth in claim 4 in which said third valve comprises a slide valve normally biased to closed position, and electrically actuated means for moving said slide valve to open position.

6. In a hydraulic actuator, the combination of casing having a reservoir for liquid therein, a hydraulic jack including a cylinder having ports at its opposite ends and a piston reciprocable in said cylinder, said jack being mounted on said casing, a pump mounted in said casing and having an intake passage communicating with said reservoir, a motor mounted on said casing to drive said pump, and a control valve system in said casing to selectively supply liquid to either port of said cylinder and discharge liquid from the opposite end of said cylinder to said reservoir, said control valve system comprising separate pressure balanced valves interposed between said pump and each port of said cylinder, separate pressure balanced valves interposed between each port and said reservoir, each of said valves normally being urged to closed position, and a pair of separate control valves to supply pressure, one being connected to one pressure-balanced valve between a cylinder port and the pump and to one valve between a cylinder port at the opposite end of the cylinder and the reservoir, and the other control valve being connected to the others of said separate valves to supply pressure from said pump to unbalance the valves selectively and supply liquid under pressure to displace said piston.

7. In a hydraulic actuator, the combination of casing having a reservoir for liquid therein, a hydraulic jack including a cylinder having ports at its opposite ends and a piston reciprocable in said cylinder, said jack being mounted on said casing, a pump mounted in said casing and having an intake passage communicating with said reservoir, a motor mounted on said casing to drive said pump, and a control valve system in said casing to selectively supply liquid to either port of said cylinder and discharge liquid from the opposite end of said cylinder to said reservoir, said control valve system comprising first separate passages connecting said pump to the ports at opposite ends of said cylinder, second separate passages connecting said reservoir to said ports, separate pressure balanced valves interposed in said passages to prevent and permit flow of liquid therethrough, said valves normally being closed to prevent flow of liquid, additional passages communicating with said valves to supply liquid from said pump to unbalance and open said valves, a first control valve interposed in one of said additional passages to open and close said one additional passage to supply liquid under pressure to actuate a valve in one of said first passages and a valve in one of said second passages, and a second control valve interposed in the other additional passage to open and close the latter to actuate a valve in each of the other first and second passages.

8. In a hydraulic actuator the combination of casing having a reservoir for liquid therein, a hydraulic jack including a cylinder having ports at its opposite ends and a piston reciprocable in said cylinder, said jack being mounted on said casing, a pump mounted in said casing and having an intake passage communicating with said reservoir, a motor mounted on said casing to drive said pump, and a control valve system in said casing to selectively supply liquid to either port of said cylinder and discharge liquid from the opposite end of said cylinder to said reservoir, said control valve system comprising means including two separate pairs of pressure actuated valves to admit liquid from said pump to either end of said cylinder and discharge liquid from either end of said cylinder to said reservoir, said pressure actuated valves normally being biased to closed position by pressure of liquid therein to prevent movement of said piston, and means including a separate pair of control valves, each corresponding to and connected to separate pressure actuated valves for admitting liquid to said jack and for discharging liquid from said jack to supply liquid under pressure from said pump to actuate corresponding pressure actuated valves and open them to drive said piston in either direction.

BENJAMIN N. ASHTON.

References Cited in the file of this patent

UNITED STATES PATENTS

| Number | Name | Date |
|---|---|---|
| 412,327 | Gibson | Oct. 8, 1889 |
| 1,910,766 | Hobson | May 23, 1933 |
| 1,927,700 | Dickinson | Sept. 19, 1933 |
| 2,275,963 | Herman et al. | Mar. 10, 1942 |